United States Patent
Nishiuchi et al.

(10) Patent No.: US 6,287,444 B1
(45) Date of Patent: Sep. 11, 2001

(54) METHOD FOR PRODUCING VERY SMALL METAL BALL

(75) Inventors: Takeshi Nishiuchi, Ibaraki; Kohshi Yoshimura, Amagasaki; Fumiaki Kikui, Osaka, all of (JP)

(73) Assignee: Sumitomo Special Metals Co., Ltd., Osaka (JP)

( * ) Notice: Subject to any disclaimer, the term of this patent is extended or adjusted under 35 U.S.C. 154(b) by 0 days.

(21) Appl. No.: 09/509,803
(22) PCT Filed: Sep. 30, 1998
(86) PCT No.: PCT/JP98/04437
  § 371 Date: May 10, 2000
  § 102(e) Date: May 10, 2000
(87) PCT Pub. No.: WO99/19543
  PCT Pub. Date: Apr. 22, 1999

(30) Foreign Application Priority Data

Oct. 9, 1997 (JP) .................................... 9-293631

(51) Int. Cl.⁷ .................................... C25D 5/02
(52) U.S. Cl. ................ 205/128; 205/143; 205/145
(58) Field of Search .................... 205/137, 143, 205/145, 149, 128

(56) References Cited

U.S. PATENT DOCUMENTS 5,487,824 * 1/1996 Griego .................... 205/128

* cited by examiner

Primary Examiner—Robert Dawson
Assistant Examiner—Michael J Feely
(74) Attorney, Agent, or Firm—Dykema Gossett PLLC

(57) ABSTRACT

An efficient method for producing a high-precision, very small metal ball, such as a Cu ball having an outer diameter not greater than 1 mm, comprising the steps of: cutting metal wire having a diameter not greater than 0.3 mm into a predetermined length; melting and solidifying the metal wires to form starting metal pieces (11); charging a plating apparatus having a double-tank structure comprising an outer splash-proofing tank (8) and an inner plating tank (3), comprising a cathode (4) located at a horizontally turning peripheral portion and an anode centrally located inside the tank; turning the inner tank (3) in a forward and reverse direction while plating solution is discharged to the outer tank (8) due to a high speed rotation of the inner tank at 50 to 800 rpm; and electroplating the starting material to form a film of predetermined thickness without generating aggregation of plated product.

2 Claims, 2 Drawing Sheets

METHOD FOR PRODUCING VERY SMALL
METAL BALL

TECHNICAL FIELD

The present invention pertains to a method for producing highly efficiently a very small metal ball such as a Cu ball having an outer diameter of not greater than 1 mm, and relates to a method for obtaining a high-precision very small metal ball having an outer diameter of not greater than 1 mm by cutting a metal wire of Cu or the like having a diameter not greater than 0.3 mm into a predetermined length, melting and solidifying the metal wires to form starting metal pieces, and plating the surfaces of the starting metal pieces with a metal such as Cu, or an alloy such as solder by means of cyclic repetition of forward rotation/reverse rotation using a plating tank which is turnable in a horizontal direction.

BACKGROUND ART

Conventionally, the very small metal balls used as bump cores in semiconductor packages of BGA (Ball Grid Array) type have outer diameter of about 0.1 mm~1.0 mm and consist of solder of predetermined composition as the material; additionally, there has recently been proposed in consideration of electrical characteristics and mechanical characteristics a chip carrier of a core material of a metal ball of Kovar (Ni—Co—Fe alloy), Cu, 42Ni—Fe alloy, or the like coated with a soldering material (Japanese Publication of Unexamined Patent Application S62-112355).

As methods for producing the aforementioned very small metal balls there have been proposed a so-called drip-into-liquid method wherein molten metal is dripped into a liquid of predetermined temperature, rendered spherical through the surface tension of the molten metal per se, and solidified as-is (Japanese Publication of Unexamined Patent Application H7-252510); so-called mechanical plastic working methods such as forming with a mold or the like (Japanese Publication of Unexamined Patent Application H4-354808); a vibrating heating method in which a metal particle or metal piece is arranged on a flat board in a non-oxidizing atmosphere, heated and melted while applying vibration thereto, rendered spherical through the surface tension thereof, and solidified as-is (Japanese Patent Publication H2-50961), and the like.

In the aforementioned drip-into-liquid method and mechanical plastic working methods, it is possible to produce very small balls of relatively large diameter, but all have poor workability and are unsuited to mass production. With the drip-into-liquid method in particular there is large deviation in dimensional precision, and to ensure very small balls having the dimensional precision required as bumps for BGA type semiconductor packages, it is necessary to separate metal balls of the desired diameter by classification, so yield is extremely poor and this is a factor contributing to increased cost.

Further, in mechanical plastic working methods, various die are required depending on ball diameter, and in addition to the aforementioned workability this is a factor contributing to increased cost.

In methods of obtaining metal balls by heating and melting in a jig as well, deviation of the diameter of the metal balls occurs as a result of deviation in individual metal wire piece unit weight; for example, in the case of a soft metal such as solder, it is difficult to obtain metal balls having identical unit weight, and therefore deviation in diameter is generated so that, like the drip-into-liquid method, there is the problem of extremely poor yield.

SUMMARY OF THE INVENTION

It is an object of the present invention to solve the aforementioned problems and provide a method for producing a very small metal ball affording highly efficient production of a very small metal ball having exceptional mass production qualities effective as a bump for semiconductor packages of BGA (Ball Grid Array) type as well as high dimensional precision, and particularly for a very small metal ball having an outer diameter of not greater than 1 mm.

As a result of various studies with the object of a method for efficient production of a very small metal ball such as a Cu ball having an outer diameter of not greater than 1 mm, the inventors discovered that by cutting a metal wire of Cu or the like having a diameter not greater than 0.3 mm into a predetermined length, melting and solidifying the metal wires to form starting metal pieces, and plating the surfaces of the starting metal pieces with a metal such as Cu, or an alloy such as solder by means of cyclic repetition of normal rotation/reverse rotation using a plating tank which is turnable in a horizontal direction, there is obtained a high-precision very small metal ball having an outer diameter of not greater than 1 mm, and perfected this invention.

Specifically, this invention is a method for producing a very small metal ball using, for example, a horizontal turning plating tank of a design wherein a plating solution charged into a tank having a cathode arranged at the inner peripheral portion within a tank turnable in a horizontal direction about a vertical shaft and an anode arranged at the center inside the tank is discharged from the turning peripheral portion; the method comprising the steps of cutting a metal wire having a diameter not greater than 0.3 mm into a predetermined length, for example, a ratio L/D of metal wire length L and diameter D of 0.7~1.5; melting and solidifying the metal wires to obtain starting metal pieces, charging the starting metal pieces into the aforementioned tank; and conducting electroplating with a desired metal or alloy by inducing electrical contact of the starting metal pieces with the cathode at the inner peripheral portion within the tank under plating bath conditions, for example, of an ion concentration of 1~70 g/l and current density of 0.05~10 A/dm², while making the plating tank to periodically repeat forward rotation in a desired direction at 50~800 rpm followed by reverse rotation to produce very small metal balls having an outer diameter of not greater than 1 mm.

BEST MODE FOR CARRYING OUT THE INVENTION

Figure 1A:
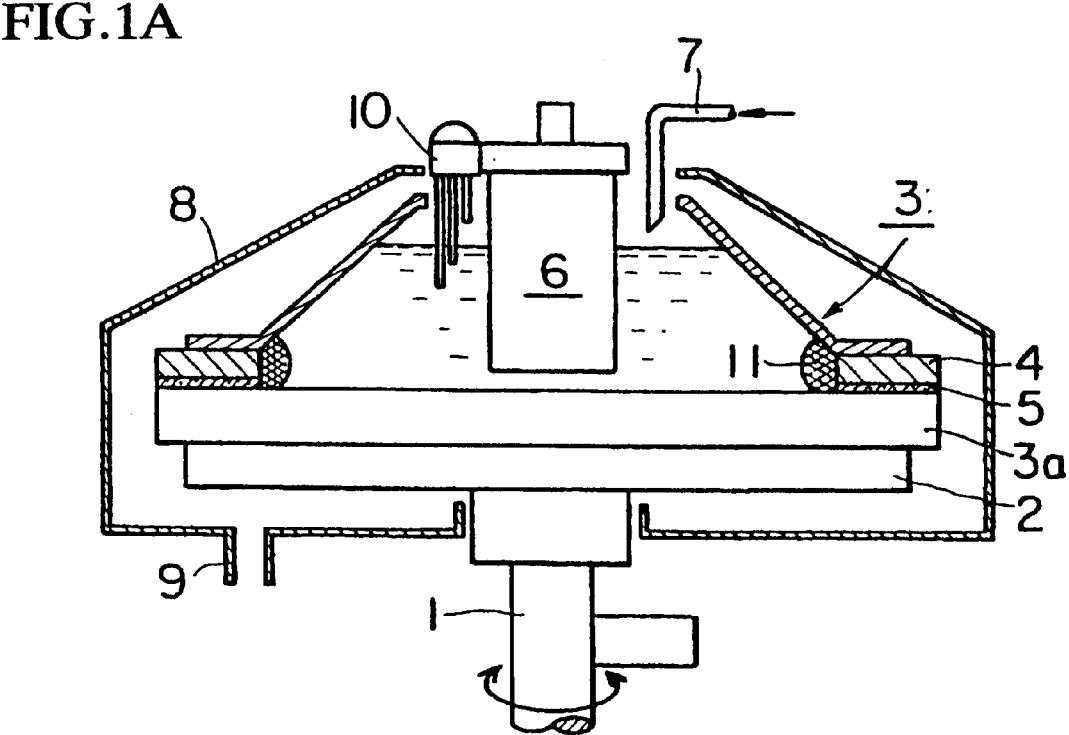
FIG. 1A is a longitudinal section illustrative diagram of the horizontal turning type plating apparatus used in this invention.
Figure 1B:
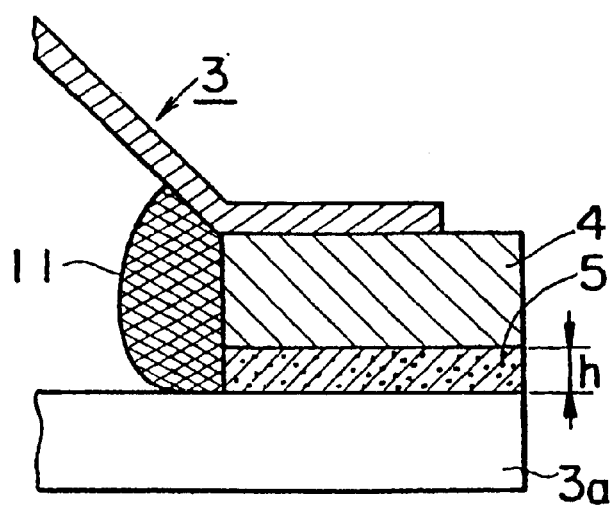
FIG. 1B is a principal element longitudinal section illustrative diagram showing the details of the plating tank bottom.

The structure of the horizontal turning type plating apparatus used in the method of this invention is shown in FIG. 1. The plating apparatus has as a principal element a conical plating tank 3 arranged on a table 2 supported by a vertical shaft 1 so that plating tank 3 turns in a horizontal direction with turning of vertical shaft 1, and comprises construction wherein a ring-shaped cathode portion (cathode) 4 and an anode portion (anode) 6 are arranged at the bottom portion circumference and at the center portion of plating tank 3, respectively, and as shown in the figure, a plating solution is charged into plating tank 3 through a solution pipe 7 by a pump and is discharged at a flow rate depending on the speed of horizontal turning to outside of the circumference portion of plating tank 3 through a porous ring 5 consisting of a porous plate with good gas permeability provided below cathode portion 4, and the plating solution is discharged through discharge port 9 of a splash-proofing tank 8 arranged so as to cover plating tank 3.

When plating tank 3 turns, plating solution flowing out from porous ring 5 in accordance with the turning speed is supplemented through a liquid level sensor 10 attached inside plating tank 3 so that the plating solution level is maintained at predetermined height.

The plating method of this invention involves forward rotation of plating tank 3 at specific speed followed thereafter by reverse rotation, this being repeated in cyclic fashion, and is characterised in that very small starting metal pieces 11 are repeatedly deposited on a peripheral wall and broken down by means of centrifugal force and inertial force generated by turning and stopping of plating tank 3, and plated while gradually changing position, thus making it difficult for aggregation to be generated.

Accordingly, with the plating method according to this invention, starting metal pieces 11 are repeatedly deposited on a peripheral wall and broken down. If metal pieces of larger outer diameter are used, however, plating is not carried out as they can not obtain adequate kinetic energy to reach the cathode. With metal pieces of small outer diameter, conversely, the plating layer can be increased through plating to the target outer diameter, as a result of which starting metal pieces 11 become very small metal balls of uniform outer diameter through plating.

In this invention, in order to make starting metal pieces 11 into very small metal balls of predetermined outer diameter, while somewhat depending on turning speed (described later), very small metal balls of any desired outer diameter can be obtained by varying a distance h between the plating tank bottom portion 3a surface and the surface at lower part of cathode portion 4, and very small metal balls of predetermined diameter can be obtained by appropriate selection of the thickness of porous ring 5 or nonconductive spacer substitute therefor, which provides the advantage of reduction in equipment cost.

Figure 2:
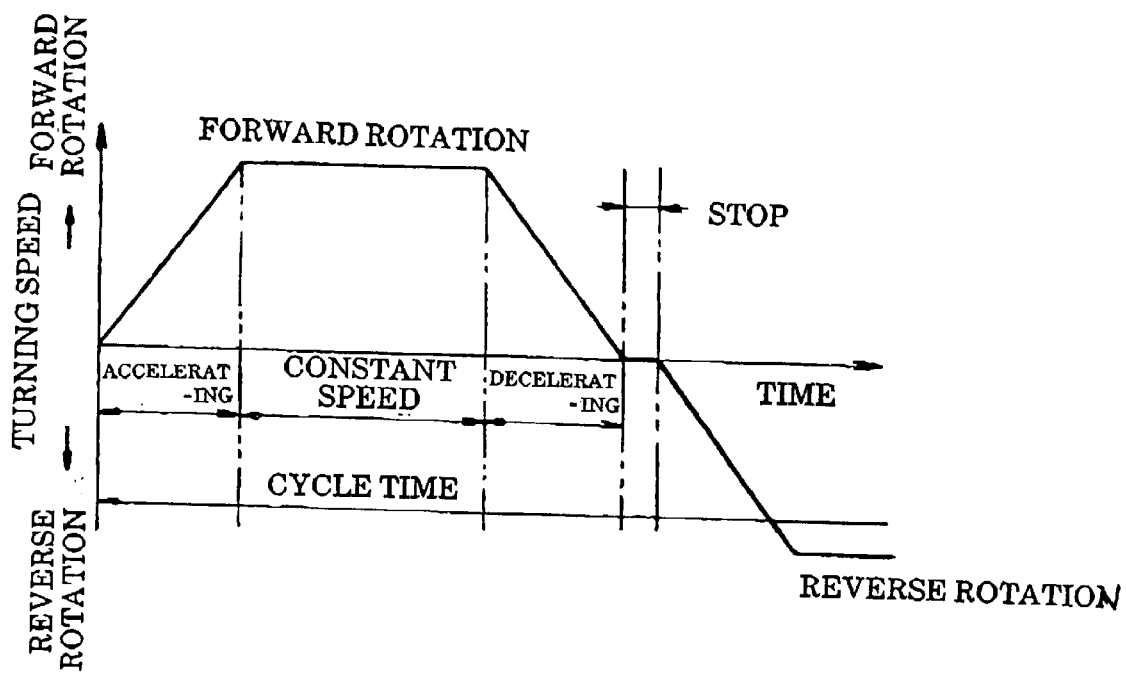
FIG. 2 is an illustrative diagram showing an example of a basic control pattern for controlling turning of the plating tank.

An example of a basic control pattern for controlling turning of plating tank 3 is shown in FIG. 2. Basically, it comprises the operation accelerating turning→ constant speed (high speed) turning→decelerating turning→stopping, with the time setting for each part being freely programmable. In this invention, plating is carried out by passing current only during the time of the constant speed operation of predetermined high speed turning, and since the very small metal balls sufficiently contact the cathode through the centrifugal force produced by turning, uniform metal film of good quality is produced and very small metal balls of good quality can be obtained.

In this invention, starting metal pieces are produced by cutting metal wire to a predetermined length and melting this, whereas if metal wire diameter exceeds 0.3 mm, deviation in the outer diameter of the starting metal pieces increases due to unavoidable deviation in the cut length of the wire material, which is undesirable for the reason that considerable time is needed for plating with uniformly arranged outer diameter, so in preferred practice the metal wire diameter should be no greater than 0.3 mm.

In this invention, where the ratio L/D of metal wire length L and diameter D is less than 0.7, cutting of the wire material is difficult, whereas in excess of 1.5 it becomes difficult to produce approximately spherical metal pieces by melting, and thus an L/D of 0.7~1.5 is preferred.

In this invention, as in ordinary electroplating, the anode uses a metal selected with reference to the target metal type or alloy composition, while the cathode can be an insoluble electrode of titanium, platinum, or the like attached in ring configuration to the peripheral wall and arranged in a location set at a predetermined distance from the plating tank bottom portion surface depending on the targeted out diameter of very small metal balls. For example, where producing a Cu ball of 0.25 mm outer diameter under the condition of a plating tank turning speed of 500 rpm, the cathode ring may be arranged at a location 15 mm away from the plating tank bottom portion surface.

In this invention, any metal that is capable of forming a metal film by plating, such as Cu, solder, Kovar (Fe—Ni—Co alloy), etc. can be used for producing very small metal balls. The ion concentration in the plating solution and the cathode current density are selected as appropriate with reference to the target starting metal pieces and plating metal, and as preferred conditions for the plating bath an ion concentration should be 1~70 g/l and current density should be 0.05~10 A/dm$^2$.

During production of Cu balls, for example, if Cu ion concentration in the plating bath is less than 40 g/l there will be high voltage across the electrodes and gas will evolve, whereas in excess of 70 g/l a disproportionation reaction occurs so that a good quality plating film is not achieved, and for this reason Cu ion concentration should be 40~70 g/l and more preferably 50~60 g/l. If current density is less than 1 A/dm$^2$ productivity is poor, and film surface becomes rough making it impossible to obtain a good film, whereas in excess of 10 A/dm$^2$ a considerable amount of gas evolves during the reaction and the occurrence of pinholes becomes a concern, so the preferred range of current density is 1~10 A/dm$^2$ and more preferably 3~5 A/dm$^2$.

During production of Au balls, Au ion concentration in the plating bath is preferably 1~15 g/l, and more preferably 2~12 g/l, while current density is preferably 0.05~2 A/dm$^2$ and more preferably 0.1~1A/dm$^2$.

In this invention, if the turning speed of the plating tank is less than 50 rpm, adequate centrifugal force can not be obtained and contact with the cathode is not adequate, whereby the plated surface will have numerous protrusions and be rough so good plating is not obtained, whereas in excess of 800 rpm the plating solution will scatter making stable plating impossible, for which reason a preferred turning speed of the plating tank is 50~800.

In this invention, if the cycle for normal rotation and reverse rotation is less than 3 seconds, the proportion of current passage time is too small which is not efficient, whereas in excess of 8 seconds contact time with the cathode becomes too long and a part of metal balls will be adhered onto the cathode portion, so the cycle for normal rotation and reverse rotation is preferably 3~8 seconds, the constant speed turning time for current passage is preferably 2 seconds~6 seconds; the normal rotation time and the reverse rotation time may be either the same or different.

In this invention, the plating solution used can be selected appropriately with reference to the type of metal. In case of Cu plating, a plating solution of copper sulfate, copper pyrophosphate etc. may be used and in the case of solder plating a solution of tin alkanolsulfonates, lead alkanolsulfonates, tin phenolsulfonates, lead phenolsulfonates, etc. may be used.

EMBODIMENTS

Embodiment 1

Cu fine wire having diameter D of 0.20 mm was cut so that the length L was 0.2 mm and the ratio L/D of length L and diameter D was 1, this was melted and sphericized to produce 150,000 starting metal pieces. In order to obtain Cu balls having outside diameter of 0.25 mm±0.015 mm, by using a Cu plating bath a sulfuric bath containing 55 g/l Cu, electroplating was performed at a bath temperature of 30° C.

As regards plating conditions, a titanium ring as the cathode ring was arranged at a location 15 mm from the tank bottom portion, and phosphorus-containing copper was used as the anode plate. Electroplating was conducted under the conditions comprising a plating tank horizontal turning speed of 500 rpm, current density of 3 A/dm$^2$, and a forward/reverse rotation cycle of 6 seconds for 9 hours so as to apply a Cu plating layer onto the surfaces of the Cu starting metal pieces.

For the resultant metal balls, particle size distribution and yield based on the rated outer diameter of 0.25 mm±0.015 were measured and shown in Table 1. Particle size distribution was computed from average value and maximum value, minimum value measured from samples of 200 balls.

Comparison 1

To produce Cu balls having an outer diameter of 0.25 mm±0.015 mm, Cu fine wire of 0.20 mm diameter was cut into a length of 0.25 mm, the metal wire pieces were subjected to thermal melting process on a vibrating flat board, and metal balls thus obtained were measured for particle size distribution and yield based on the rated outer diameter of 0.25 mm±0.015 mm. The results are shown in Table 1. Particle size distribution was carried out by the same method as in Embodiment 1.

Embodiment 2

Solder fine wire having diameter D of 0.15 mm, Sn/Pb=1/9 was cut so that the length L was 0.15 mm and the ratio L/D of length L and diameter D was 1, these wire pieces were melted and sphericized to produce 100,000 starting metal pieces. To obtain solder balls having outside diameter of 0.20 mm±0.012 mm, plating solution of pH <1 containing alkanolsulfonic acid containing 2.3 g/l tin and 7.7 g/l lead, and a semi brightening agent was used as a solder plating bath, and electroplating was performed at a bath temperature of 23° C.

As regards plating conditions, a titanium ring was arranged as the cathode ring at a location 18 mm from the tank bottom portion, while Sn/Pb=1/9 solder was used as the anode plate, electroplating was performed for 6 hours under the conditions that horizontal turning speed of a plating tank was 600 rpm, current density was 0.4 A/dm$^2$, and a forward/reverse rotation cycle was 5 seconds, whereby a solder plating layer was applied on the surfaces of the solder starting metal pieces.

Particle size distribution of the resultant metal balls and yield based on the rated outer diameter of 0.20 mm ±0.012 mm were measured and are shown in Table 1. Particle size distribution was carried out by the same method as in Embodiment 1.

Comparison 2

To produce solder balls having an outer diameter of 0.20 mm±0.012 mm, solder fine wire with a diameter of 0.18 mm and Sn/Pb=1/9 was cut into a length of 0.17 mm, and subjected to thermal melting process on a vibrating flat board. Metal balls thus obtained were measured for particle size distribution and yield based on the rated outer diameter of 0.20 mm±0.012 mm. The results are shown in Table 1. Particle size distribution was carried out by the same method as in Embodiment 1.

TABLE 1

|  | particle size distribution | yield |
| --- | --- | --- |
| Embodiment 1 | 0.253 ± 0.018 mm | 97% |
| Embodiment 2 | 0.197 ± 0.015 mm | 95% |
| Comparison 1 | 0.246 ± 0.035 mm | 86% |
| Comparison 2 | 0.205 ± 0.029 mm | 82% |

Industrial Applicability

According to the invention, as will be apparent from the Examples above, a metal wire of Cu or the like having a diameter not greater than 0.3 mm is cut into a desired length, these wire pieces are sphericized by melting and solidifying to obtain starting metal pieces, and surfaces of these starting metal pieces are plated with a metal such as Cu or an alloy such as solder by using a plating tank which is turnable in a horizontal direction and by periodically repeating forward and reverse rotations of the plating tank at a high speed, whereby very small metal balls can be efficiently mass produced as high-precision very small metal balls having desired outer diameter of no more than 1 mm without causing aggregation in themselves.

What is claimed is:

1. A method for producing a very small metal ball comprising the steps of:

using a horizontally turnable plating tank having a cathode located at a turning peripheral portion and an anode centrally located inside the tank, said tank being such that a plating solution charged into the tank is discharged from the turning peripheral portion;

cutting a fine metal wire having a diameter D of less than 0.3 mm into metal pieces, each of which has a desired length L which is correlated to the diameter D such that a ratio of the length L to the diameter D is 0.7–1.5;

melting and solidifying the thus cut metal pieces to form starting metal pieces;

charging the thus formed starting metal pieces into said plating tank; and periodically repeating rotation and reverse rotation of said plating tank in a desired direction to contact said starting metal pieces with said cathode located at the turning peripheral portion of said plating tank, thereby forming very small metal balls having an outer diameter of less than 1 mm under the conditions of plating said starting metal pieces with a desired metal or alloy, said conditions comprising and ion concentration of 1–70 g/l and a current density of 0.05–10 A/dm$^2$.

2. The method for producing a very small metal ball according to claim 1, wherein the plating tank is turned at a turning speed of 50~800 rpm.

* * * * *